March 25, 1930. W. L. FLEISHER 1,751,806
VENTILATING SYSTEM
Filed Feb. 8, 1928
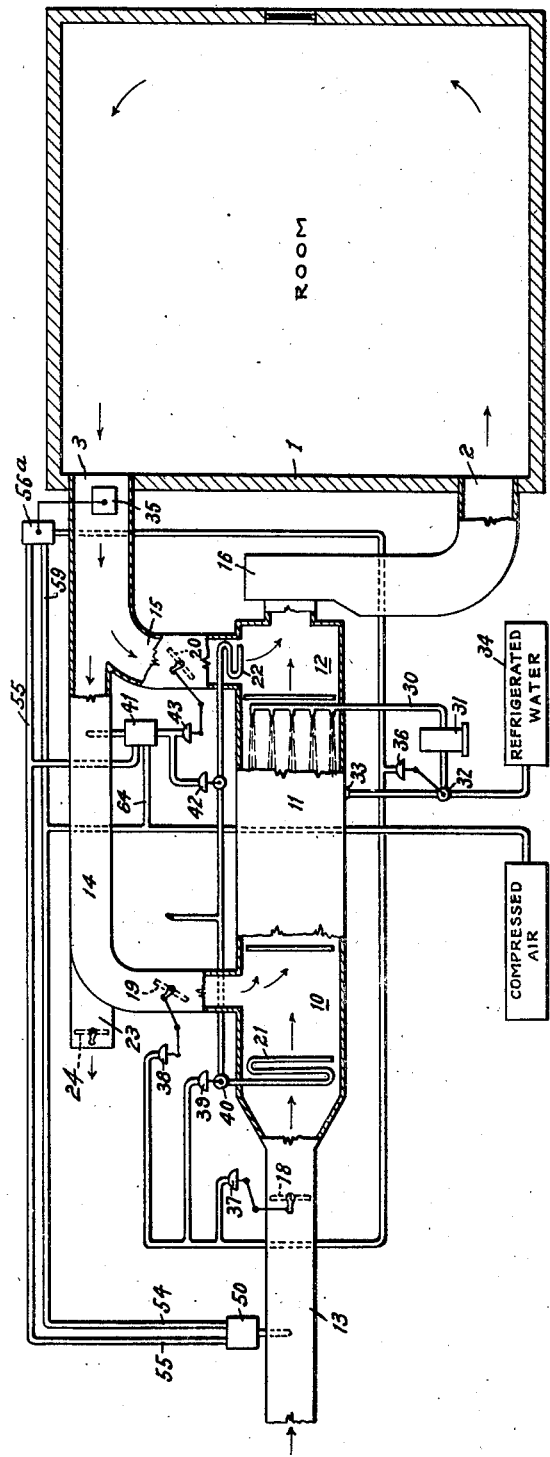
INVENTOR.
Walter L. Fleisher
BY
ATTORNEYS.

Patented Mar. 25, 1930

1,751,806

UNITED STATES PATENT OFFICE

WALTER L. FLEISHER, OF NEW YORK, N. Y., ASSIGNOR TO THE COOLING & AIR CONDITIONING CORPORATION, OF NEW YORK, N. Y., A CORPORATION OF NEW YORK

VENTILATING SYSTEM

Application filed February 8, 1928. Serial No. 252,759.

This invention relates to ventilation, more particularly to ventilation of public enclosures intended for human occupation. The invention is particularly applicable to public auditoriums such as theaters and will be particularly described in connection with such an installation although obviously many features of it will be of wide application.

In theater ventilation particularly, it has been found that the standard of conditions to be maintained within the theater to produce the greatest comfort to the occupants varies with the external conditions. For example, in the summer months, if the external dry bulb temperature is in the neighborhood of 70° with a wet bulb temperature of 70°, it may be found desirable to maintain within the theater a dry bulb temperature of 70° and a relative humidity of 50%. Should, however, the external temperature rise to substantially 95° or the wet bulb temperature to 78°, the conditions formerly maintained will be found too chilly for comfort. It is desirable under such conditions to raise the dry bulb temperature for example to 80° and a relative humidity of 40%. This latter standard of conditioning, however, would be found hot and oppressive if still maintained after the external conditions had fallen to their former temperature. It is an object of this invention to maintain comfort conditions within the theater taking into account the external conditions.

It is not desirable, however, that this adjustment be continued too far since it is not comfortable to cause the temperature within the theater to fall below a predetermined standard such for example as a dry bulb temperature of 70° and a wet bulb temperature of 58½° no matter how low the external temperature may fall. Furthermore, there is an upper limit beyond which it is not desirable that the temperature be brought no matter how high the external temperature may be.

It is a further object therefore to limit the adjustment of the temperature to external conditions so that excessive external temperatures either high or low are not met by excessive internal temperatures.

The invention accordingly comprises a system possessing the features, properties, and the relation of elements which will be exemplified in the system hereinafter described and the scope of the application of which will be indicated in the claims.

Fig. 1 is a diagrammatic view of an illustrative embodiment of the invention.

Fig. 2 is a diagrammatic view illustrating the controls.

In the drawing the numeral 1 indicates a room having an air inlet at 2 and an outlet at 3. A suitable air conditioner is provided which as illustrated, comprises a conditioner 11, having a mixing chamber, 10, at the inlet, and a mixing chamber 12 at the discharge end thereof. Air is admitted to the mixing chamber 10 either from the outside through a conduit 13 or from the outlet 3 through a conduit 14. Air from the outlet 3 may also be admitted to the mixing chamber 12 through a branch conduit 15 and air is taken from the mixing chamber 12, as by a fan 16, to the inlet 2. Suitable dampers 18, 19 and 20 control the fresh air through the conduit 13 and the return air through the conduits 14 and 15. A heater 21 is arranged to add heat to the air within the mixing chamber 10 when the air moistening is otherwise inadequate. As this is generally caused by a low temperature of the fresh air, the heater may be placed at the exit of the fresh air conduit if desired. A heater 22 is arranged to add heat to the air before it is delivered to the room, and this heater may conveniently be placed within the conduit 15. It will be obvious however, that the heaters 21 and 22 may be placed in any suitable relation to their respective mixing chambers if desired. An outlet 23, controlled by a balanced damper 24 permits the exit of the foul air when the dampers 19 and 20 are both closed.

In accordance with this invention, means are provided for maintaining the air in the room at a certain standard of conditions as to temperature or humidity or both, and for varying that standard for comfort conditions when the outside conditions demand. A practical form of accomplishing this result utilizes the control of the temperature within the conditioning apparatus as the means for regulating the humidity within the room. This may be controlled either by regulating the temperature of the spray water or by controlling the temperature of the air which is admitted to the conditioner.

A separate means is provided for controlling superheat which may be accomplished either by directly adding heat or by diluting the conditioned air with air having a higher degree of superheat, or both.

In the particular embodiment of the invention herein illustrated, water is carried to the sprays through a conduit 30 from a pump 31 being supplied under the control of a three way valve 32, either from a sump 33 at the bottom of the conditioner or from a refrigerator system 34. A wet bulb thermostat 35 is arranged to control motors 36, 37, 38, and 39, for the operation respectively of the three way valve 32 and of the dampers 18 and 19 and of a valve 40 for controlling the admission of steam to the heater 21. The operation of this mechanism is such that if the air within the chamber be too moist, heat from the heater 21 is first cut off, thereafter the dampers 18, and 19 are operated, reversely, to discontinue the use of return air and substitute fresh air, to the mixing chamber 10. Should this be insufficient to restore the standard conditions, the mixing valve 32 is operated to substitute refrigerated water for return water to the sprays.

The thermostat 41, also responsive to the condition of the air of the room operates motors 42 and 43, controlling respectively the supply of the steam to the coil 22 and the damper 20, in a manner such that if the temperature within the inclosure becomes too low, the damper 20 is first operated to increase the quantity of return air which is admitted to the mixing chamber 12, thereby decreasing the quantity of conditioned air which is drawn through the washer. If this be insufficient to maintain the temperature, steam is admitted to the heater 22.

A system such as above described will maintain within the enclosure a standard of conditions determined by the setting of the thermostats 35 and 41. In order to vary this standard to comfort condition, there is provided a thermostat 50 responsive to outside conditions, which thermostat is arranged to alter the effect of the thermostats 41 and 35 whenever the external temperature rises above a certain value.

The diagram of Figure 2 is illustrative of a manner of doing this. The thermostat 50, comprising as illustrated an expansion chamber 51 responsive to the external air, and having a flexible wall 52 carrying a needle valve 53 for controlling the flow of compressed air from a compressed air source 54 to a conduit 55. The arrangement being such that as the external temperature rises, compressed air is admitted to the conduit 55. This admission, however, is a gradual one.

The relative position of the needle to the valve seat, may be so arranged that a rise in temperature will not actually start to open the valve until a predetermined temperature is reached. During the further rise in temperature, as the valve is gradually opened, the flow of air is commenced, building up pressure within the system until the throttling effect ceases with the valve open. Thereafter a further rise in temperature meets with no further pressure increase, and hence no further effect upon the thermostats. In this manner the operation may be arranged to cause the thermostat 50 to become effective in its regulation only between certain specified minimum and maximum temperatures.

The wet bulb thermostat 35 is preferably of the air moistening type illustrated in my copending application Serial #235,357, filed November 23rd, 1927, in which a small body of water is brought to the wet bulb temperature by causing a portion of the air to be measured to pass through the spray. The wet bulb temperature itself is determined by measuring the temperature of the water. A thermostat device within the water of the instrument 35 may actuate an operating coil 56 of the control valve 56ª to operate a solenoid armature 57 to move the needle valve 58, to admit compressed air from a compressed air supply 59, to the motors 36, 37, 38 and 39.

The dry bulb thermostat 41, comprises an expansion chamber 60 adapted to respond to the temperature of the return air and having a flexible wall 61, connecting with a lever 62, to control the needle valve 63 to admit compressed air from the compressed air supply 64 to the motors 42, and 43. Each of the thermostats 35 and 41 is provided with a chamber 65 and 66, each of which is in communication with the conduit 55 and within this system there is provided a leak 67, whereby the pressure within these chambers varies in accordance with the throttling of the compressed air of the needle valve 53. The chamber 65 is connected with the needle valve 58 to oppose the movement of the armature 57 in response to the solenoid 56.

When the high outer temperature admits compressed air to the chamber 65, the needle valve 58 will be opened with greater difficulty by the wet bulb thermostat and hence a higher wet bulb temperature will be maintained within the room.

Similarly the chamber 66 is arranged to oppose the action of the chamber 60 to cause the needle 63 to be operated with greater difficulty and hence to maintain a higher dry bulb temperature within the room. By controlling the size of the chambers, 65 and 66, and the leverage employed, the degree of rise in the inside temperature may be adjusted at will.

By the above construction it will be evident that during cold weather and until the outside temperature rises above the critical value, the thermostats 41 and 35 will operate while the needle valve 53 remains seated, thus maintaining the standard of dry and wet bulb temperature within the room for which the thermostats are set. As soon however, as the critical temperature is reached and the needle valve 53 starts to open, pressure starts to build up within the chambers 65 and 66 which, opposing the operation of the thermostats themselves, in effect, sets them to a higher value and causes that higher value to be maintained within the room.

The invention accordingly comprises the features of construction combinations of elements, and arrangement of parts, which will be exemplified in the construction hereinafter set forth and the scope of the application of which will be indicated in the claims.

It is also to be understood that the following claims are intended to cover all of the general and specific features of the invention herein described, and all statements of the scope of the invention which, as a matter of language, might be said to fall therebetween.

Having described my invention, what I claim as new and desire to secure by Letters Patent, is:—

1. In a ventilating system, in combination, means for admitting external air to said room, means for maintaining a standard of humidity within a room, means responsive to external temperature conditions for varying said standard, and means for imposing a minimum and maximum limit upon such variation.

2. In a ventilating system, in combination, means for circulating air into an enclosure, means for varying the condition of the entering air in response to the condition of the air of the enclosure to maintain a standard of condition within the enclosure, means for admitting outside air to said enclosure, and means responsive to the dry bulb temperature of such outside air to vary said standard, and for varying the standard responsive to temperature changes, by maintaining a desired differential between indoor and outdoor temperatures within predetermined limits.

3. In a ventilating system, in combination, means for circulating air into an enclosure, means for conditioning said air, a wet bulb thermostat responsive to the wet bulb temperature of the air in the enclosure to vary said conditioning to maintain a standard of humidity within the room, and means responsive to outside dry bulb temperature to vary the operation of said thermostat within a defined range.

4. In a ventilating system in combination, means for circulating air into an enclosure, means for conditioning said air, a wet bulb thermostat responsive to the wet bulb temperature of the air in the enclosure to vary said conditioning to maintain a standard of humidity within the room, and means operating within limits as defined by comfort conditions and acting responsive to outside and dry bulb temperature to vary the operation of said thermostat.

5. In a ventilating system in combination, means for circulating air into an enclosure, means for conditioning said air, means responsive to the wet bulb temperature within the enclosure to maintain a standard of humidity conditions therein, and means responsive to the dry bulb temperature within the enclosure to maintain a standard of dry bulb temperature, and means responsive to external conditions to vary the standard of dry bulb temperature.

6. In a ventilating system in combination, means for circulating air into an enclosure, means for conditioning said air, a wet bulb thermostat responsive to the wet bulb temperature of the air in the enclosure to vary said conditioning to maintain a standard of humidity within the room, and means responsive to the dry bulb temperature within the enclosure to maintain a standard of dry bulb temperature, and means responsive to outside temperature to vary said standards of humidity and temperature, and means to limit said variation within a predetermined range of outside dry bulb temperatures.

7. A ventilating system comprising, in combination, a conditioning apparatus including a conditioner, a thermostat responsive to room temperature for regulating the temperature within the conditioner, and master control means responsive to outside temperature for causing said thermostat to maintain a differential between indoor and outdoor temperatures, commencing at a predetermined low point and effective within a predetermined high point.

8. In a device of the character described, in combination, a conditioner, means for conducting conditioned air to an enclosure, means for supplying to the intake of the conditioner, both fresh and return air, a thermostat responsive to the wet bulb temperature of the air within the enclosure for varying the proportions of fresh and return air, and a master thermostat operative within predetermined temperature levels for varying the action of said first thermostat.

9. In a device of the character described, in combination, a conditioner, means for conducting air from the discharge of said conditioner to an enclosure, means for supplying return air to the discharge of said conditioner, means for supplying return and fresh air to the intake of said conditioner, a thermostat responsive to humidity within the enclosure for varying the proportions of fresh and return air fed to said conditioner, a thermostat responsive to temperature within the enclosure for varying the amount of return air to the conditioner discharge, and a master control responsive to outside dry bulb temperature conditions for varying the effect of said thermostats to cause a differential to be maintained between outdoor and indoor humidity conditions.

10. In a device of the character described in combination, a conditioner, means for conducting air from the discharge of said conditioner to an enclosure, means for supplying return air and heat to the discharge of said conditioner, means for supplying return and fresh air to the intake of said conditioner, a thermostat responsive to humidity within the enclosure for varying the proportions of fresh and return air fed to said conditioner, a thermostat responsive to temperature within the enclosure for varying the amount of return air to the conditioner discharge, and a thermostat responsive to outside dry bulb temperature conditions for varying the effect of both of said thermostats.

11. The method of ventilation which comprises supplying air to an enclosure, conditioning said air, controlling the dewpoint of the conditioned air to maintain a standard dewpoint in the air of the room, controlling the temperature of the air after conditioning to maintain a standard of temperature in the enclosure, and varying one of said standards to correspond differentially with changes in outdoor temperature within prescribed limits.

12. The method of ventilation which comprises supplying air to an enclosure, conditioning said air, controlling the dewpoint of the conditioned air to maintain a standard dewpoint in the air of the room, and controlling the temperature of the air after conditioning by diluting the conditioned air with varying quantities of return air to maintain a standard of temperature in the enclosure, and varying one of said standards by the outside temperature for maintaining a differential between said standard and the outside temperature.

13. In a ventilating system in combination, a conditioner, means for supplying conditioned air to an enclosure, a thermostat for maintaining the humidity and a second thermostat for maintaining the temperature, both said thermostats being responsive to room conditions and a thermostat responsive to outside temperatures for varying the effect of both said first mentioned thermostats to maintain a differential between indoor and outdoor temperature.

14. In a ventilating and conditioning system, in combination, an enclosure having an inlet and outlet, an air conditioning unit, means connecting said unit to the enclosure inlet, a duct connecting said unit to the enclosure outlet, a valve within said duct, means responsive to the wet bulb conditions of the air within said enclosure and acting to operate said valve, and a controlling member for said last named means and acting in response to dry bulb temperature conditions of the outside air to vary the action of said valve operating means.

15. An air conditioning system including, in combination, an enclosure member provided with an inlet and outlet, an air conditioning unit, a duct extending therefrom and in communication with the outside air, a duct extending from the discharge end of said unit and connecting the same with the inlet opening of said enclosure, a further duct extending from the outlet opening of said enclosure to the intake end of said unit, a by-pass duct extending from said last named duct to a point adjacent the discharge end of said unit, valves positioned within the air inlet ducts communicating with said unit, means for operating said valves in response to the wet bulb temperature conditions within said enclosure, and means exposed to the outside air and acting in response to the dry bulb temperature conditions thereof to modify the action of said valve operating means.

In testimony whereof I affix my signature.

WALTER L. FLEISHER.